United States Patent
De Ruffray et al.

(10) Patent No.: US 8,028,955 B2
(45) Date of Patent: Oct. 4, 2011

(54) LANDING GEAR CASING PROVIDED WITH A BOX STRUCTURE

(75) Inventors: Paul De Ruffray, Toulouse (FR); Rodolphe Morel, Toulouse (FR)

(73) Assignee: Airbus France, Toulouse (FR)

( * ) Notice: Subject to any disclaimer, the term of this patent is extended or adjusted under 35 U.S.C. 154(b) by 627 days.

(21) Appl. No.: 12/123,958

(22) Filed: May 20, 2008

(65) Prior Publication Data

US 2010/0237189 A9      Sep. 23, 2010

Related U.S. Application Data

(63) Continuation of application No. PCT/EP2006/067849, filed on Oct. 27, 2006.

(30) Foreign Application Priority Data

Nov. 21, 2005 (FR) ...................................... 05 53536

(51) Int. Cl.
*B64C 1/14* (2006.01)
*B64C 25/00* (2006.01)
*B64C 25/10* (2006.01)

(52) U.S. Cl. ................................. 244/102 R; 244/117 R

(58) Field of Classification Search ............. 244/102 R, 244/102 A, 102 SL, 102 SS, 104 R, 104 CS, 244/104 FP, 104 LS, 17.17, 117 R, 119
See application file for complete search history.

(56) References Cited

U.S. PATENT DOCUMENTS

| 2,405,918 | A | * | 8/1946 | Watter .......................... 244/119 |
| 2,437,574 | A | * | 3/1948 | Watter et al. .............. 244/102 R |
| 5,100,083 | A |   | 3/1992 | Large et al. |
| 5,482,228 | A | * | 1/1996 | Hoshino .................. 244/102 A |
| 6,213,426 | B1 |  | 4/2001 | Weber et al. |
| 6,638,466 | B1 | * | 10/2003 | Abbott ......................... 264/238 |

FOREIGN PATENT DOCUMENTS

| EP | 0899191 A | 3/1999 |
| EP | 0980822 A | 2/2000 |

* cited by examiner

*Primary Examiner* — Tien Dinh
*Assistant Examiner* — Richard R Green
(74) *Attorney, Agent, or Firm* — Perman & Green, LLP

(57) ABSTRACT

A reduced-volume landing gear casing for the landing gear of an aircraft including a box structure to which the landing gear is fixed and which takes up the loads acting thereon. The box structure can include, in particular, means for receiving the fixing bearings of the landing gear.

10 Claims, 2 Drawing Sheets

LANDING GEAR CASING PROVIDED WITH A BOX STRUCTURE

CROSS REFERENCE TO RELATED APPLICATIONS

This application is a continuation of International Application No. PCT/EP2006/067849, International Filing Date, 27 Oct. 2006, which designated the United States of America, and which International Application was published under PCT Article 21 (2) as WO Publication No. WO2007/057288 and which claims priority from French Application No. 0553536, filed on 21 Nov. 2005.

BACKGROUND

1. Field

The disclosed embodiments relate to a landing gear casing or bay with a structure made up of box sections for the retracting landing gear of an aircraft.

2. Brief Description of Related Developments

Aircraft landing gear bays are designed to house the landing gear and to partition the often pressurized internal volume of the aircraft from the outside.

Because of the loadings to which they are subjected, these being ground loadings transmitted through the landing gear during landing and compressive loadings due to internal pressurization, and because they have to house the landing gear when the gear is up, landing gear bays of the prior art comprise reinforcing frames in the form of arches, extending the fuselage frame elements distributed longitudinally along the bay and surrounding the landing gear bay. The reinforcing frames stiffen the landing gear bay panels in such a way as to form stiffened flat panels.

These panels of the prior art house the landing gear bearings and seal the landing gear bay region. This construction makes the landing gear bay bulky and heavy.

SUMMARY

It is an aspect of the disclosed embodiments to produce a landing gear bay of reduced volume, optimized such that it can withstand the two types of loads, ground loadings and pressurization loadings, and in order to do this the disclosed embodiments propose a reduced-volume landing gear bay for the landing gear of an aircraft, which has a box-section structure to which the landing gear is attached and which reacts the loads to which the landing gear is subjected.

Advantageously, the landing gear bay comprises an envelope structure added over the box-section structure in order to react the pressurization loadings.

The box sections that make up the box-section structure are as far as possible concentrated around the edges of the doors.

In this respect, the disclosed embodiments are particularly well suited to landing gears the bearings of which are located as close as possible to the skin of the fuselage.

In the case of such landing gears, the box-section structure enables a significant saving in terms of volume. In particular, in the case of front landing gear with telescopic struts, the fact that the landing gear bearings are positioned near the skin of the fuselage limits the volume occupied by the landing gear when the gear is up.

Further features and advantages of the disclosed embodiments will be better understood by reading the following description of some non-limiting exemplary embodiments with reference to the figures which depict:

DETAILED DESCRIPTION OF THE DRAWINGS

Figure 1:
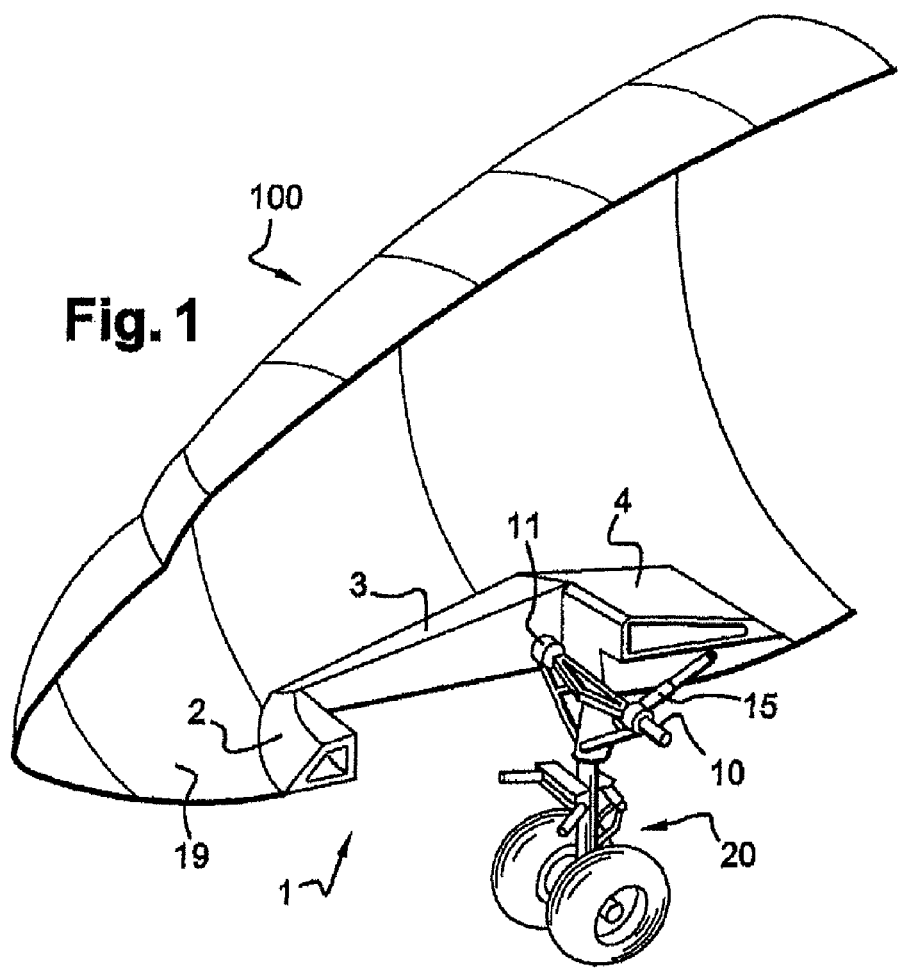
FIG. 1: an aircraft nose section viewed in perspective-section and equipped with a landing gear bay according to the disclosed embodiments.

The landing gear bay 1 according to the disclosed embodiments and depicted in FIG. 1 is a reduced-volume landing gear bay housing the landing gear 20 of an aircraft 100.

The landing gear depicted is front landing gear housed under the nose of the aircraft 100, that is to say in a part of the aircraft that is of small size and contains numerous pieces of equipment.

It is particularly advantageous to reduce the volume and mass of the landing gear bay in this part of the aircraft as permitted by the disclosed embodiments which proposes a low-volume landing gear box structure.

The aircraft the nose of which is equipped with a landing gear bay according to the disclosed embodiments may, in particular, house additional equipment, this equipment furthermore being easier to arrange and to access.

As depicted in FIG. 1, the landing gear bay of the disclosed embodiments has a structure in the form of box sections 2, 3, 4, 5.

The landing gear 20 is attached to this structure which reacts the loads to which the landing gear is subjected.

The box-section structure comprises a front box section 2, one portion of which is depicted in FIG. 1, that forms a front cross-member of the landing gear bay 1, lateral box sections 3, 5 that form the lateral sides of the landing gear bay 1, and a rear box section 4 that forms a rear cross-member of the landing gear bay 1.

The box sections 2, 3, 4, 5 are profiled in such a way as to achieve a gradual transition to the structure of the fuselage and to increase their rigidity.

These box sections may be made of lightweight material such as aluminum for assembled stiffened panels or, for preference, in the case of an aircraft of composite structure, the box sections of the box-section structure may be made of composite materials, particularly by draping composite fabric 32 over supports 33 that act as stiffeners.

The box-section structure of the disclosed embodiments are particularly well suited to placing the landing gear attachment bearings as close as possible to the skin 19 of the aircraft in order further to reduce the volume occupied by the landing gear bay in the aircraft in the heightwise direction.

To attach the landing gear 20, the box-section structure comprises means for housing the bearings 10, 11 for attaching the landing gear.

Figure 5:
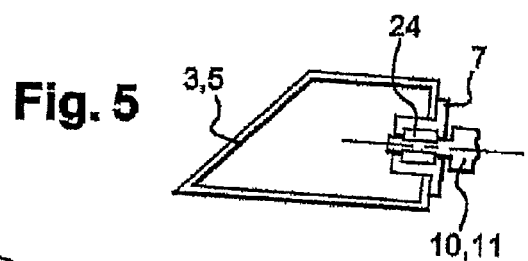
FIG. 5: a cross section through a detail of embodiment of a means of housing a bearing according to the disclosed embodiments.

FIG. 5 provides an exemplary embodiment of such a means consisting, for example, of an insert 7 fixed to the lateral box section 3, 5 and housing a rolling bearing or a ring 24 for a landing gear bearing 10, 11.

Furthermore, the landing gear bay according to the disclosed embodiments is particularly well suited to use in combination with a landing gear 20 comprising at least one telescopic strut 15, 151, 152, the box-section structure comprising means for housing bearings 13, 14 of said strut near the skin of the fuselage, it being possible for these means to be identical to the means housing the landing gear bearings.

Figure 2:
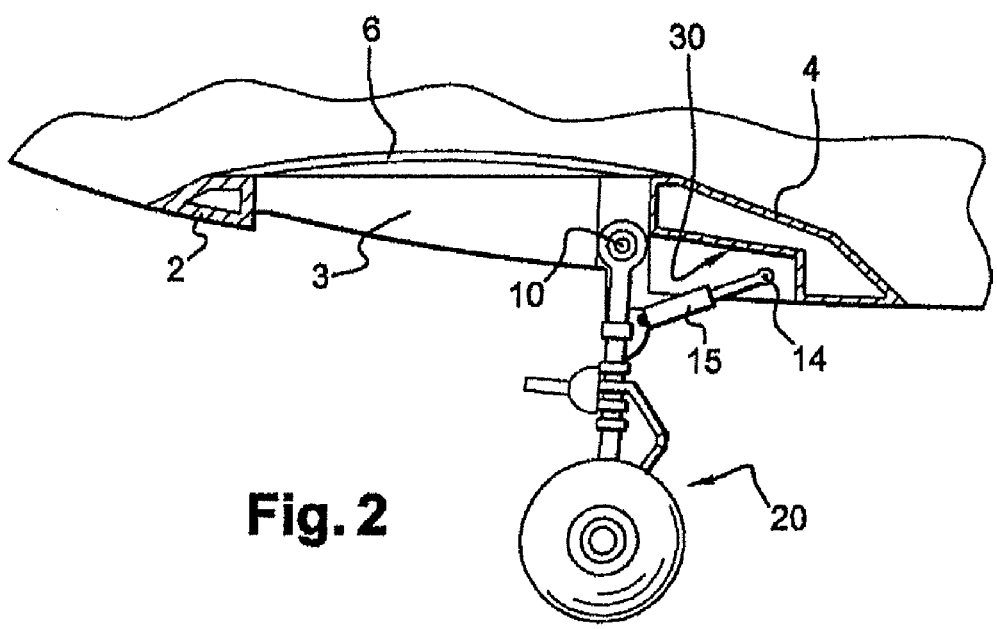
FIG. 2: a sectioned side view of the landing gear bay of FIG. 1.

In particular, in the case of a telescopic rear strut 15, according to the example of FIGS. 1 and 2, the rear box section 4 is provided with a housing 30 in which the strut 15 is deployed, the side walls of this housing 30 housing one or two bearings of the strut 15.

Figure 3:
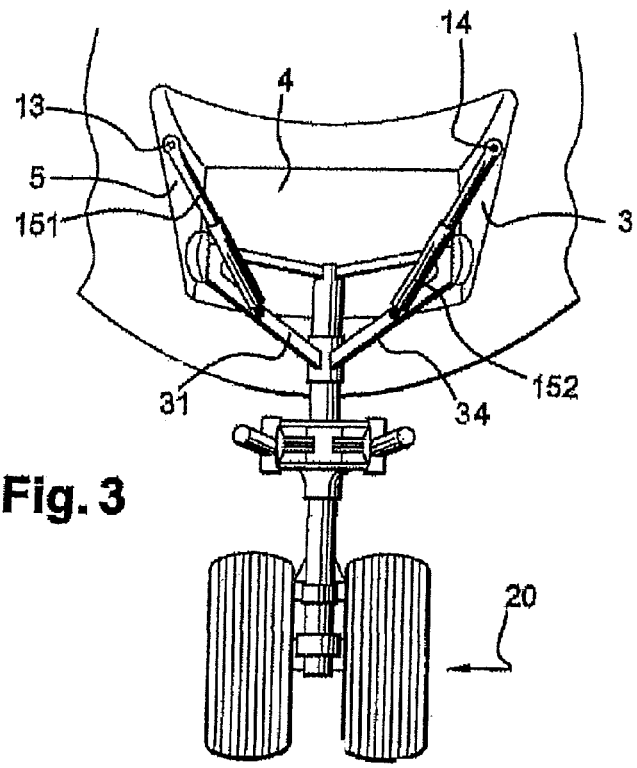
FIG. 3: a perspective front view of an alternative embodiment of a landing gear bay according to the disclosed embodiments.
Figure 4:
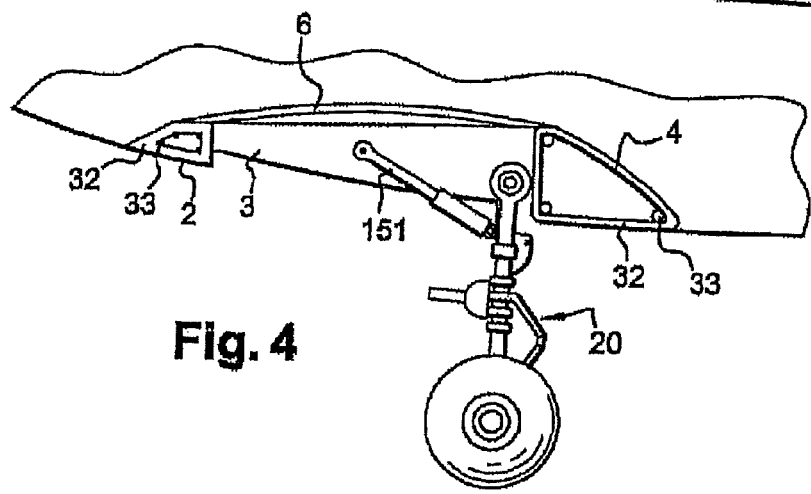
FIG. 4: a sectioned side view of the landing gear bay of FIG. 1, adapted to suit the landing gear of FIG. 3.

According to the examples of FIGS. 3 and 4, the landing gear comprises two telescopic front struts 151, 152 positioned diagonally with respect to the landing gear and connected to reinforcing bars 31, 34 of the landing gear.

These diagonal struts are each provided with a bearing 13, 14, the bearings of these struts being, like the landing gear bearings, housed in the lateral box sections 3, 5.

The landing gear bay according to the disclosed embodiments advantageously comprises an envelope structure 6 added onto the box-section structure, to react the pressurization loadings.

This envelope 6 is, in particular, a hood of rounded shape designed to react such loadings.

Thus, the landing gear bay of the disclosed embodiments are provided with a structure that is split between a structural part and a part that protects the internal space of the aircraft.

The box sections positioned around the space housing the landing gear constitute the structural part of the landing gear bay by forming the framework of a frame for attaching and reacting the loads of the landing gear, while the envelope structure 6, added over the frame, constitutes the part that protects the structure and reacts the pressurization loadings.

The disclosed embodiments are not restricted to the examples depicted and, in particular, the box sections may be assembled in the form of a complete frame before they are installed in the structure of the aircraft and may also contain the mechanisms for opening and closing the loading gear bay.

The invention claimed is:

1. A reduced-volume landing gear bay for a landing gear of an aircraft, comprising a frame having a box-section structure to which the landing gear is attached and which reacts to loads to which the landing gear is subjected, wherein the box-section structure comprises front rear and lateral frame elements with framed box sections that form respective front, rear and lateral sides of the landing gear bay, said lateral frame elements enclosing means for housing bearings for attaching the landing gear.

2. The landing gear bay as claimed in of claim 1, wherein, the landing gear comprises at least one telescopic strut having further bearings, and the box-section structure comprises means for housing said further bearings of said strut near a skin of the fuselage.

3. The landing gear bay as claimed in claim 2, wherein the rear box section forms a rear cross-member of the landing gear bay, wherein said strut is a rear strut and wherein the rear box section has a housing to house this rear strut.

4. The landing gear bay as claimed in claim 2, wherein the landing gear comprises two telescopic front struts each provided with a said further bearing housed in a lateral box section of said lateral frame element.

5. The landing gear bay as claimed in claim 1, wherein the front box section forms a front cross-member of the landing gear bay.

6. The landing gear bay as claimed in claim 1, wherein the rear box section forms a rear cross-member of the landing gear bay.

7. The landing gear bay as claimed in claim 1, wherein the box-section structure is made of composite materials by draping composite fabric over supports that act as stiffeners.

8. The landing gear bay as claimed in claim 1, wherein the frame comprises a framework for attaching and reacting to the loads of the landing gear and which forms a structural part of the landing gear bay, the box section structure further comprising an envelope structure, added over the frame, constituting a part that protects the box section structure and reacts to pressurization loadings.

9. An aircraft equipped with a landing gear bay as claimed in claim 1.

10. An aircraft equipped with a landing gear bay as claimed in claim 1, wherein the frame comprises a framework for attaching and reacting to the loads of the landing gear and which forms a structural part of the landing gear bay, the box section structure further comprising an envelope structure, added over the frame, constituting a part that protects the box section structure and reacts to pressurization loadings.

* * * * *

UNITED STATES PATENT AND TRADEMARK OFFICE
CERTIFICATE OF CORRECTION

PATENT NO. : 8,028,955 B2  
APPLICATION NO. : 12/123958  
DATED : October 4, 2011  
INVENTOR(S) : De Ruffray et al.

Page 1 of 1

It is certified that error appears in the above-identified patent and that said Letters Patent is hereby corrected as shown below:

Column 4, line 5, Claim 2, delete "of".

Signed and Sealed this  
Seventeenth Day of January, 2012

David J. Kappos  
*Director of the United States Patent and Trademark Office*